Nov. 15, 1966   R. I. ELLIOTT ETAL   3,284,967
LAMINATED COVER ELEMENTS AND FLASHING
AND SEALING MEANS THEREFOR
Filed March 18, 1964   2 Sheets-Sheet 1
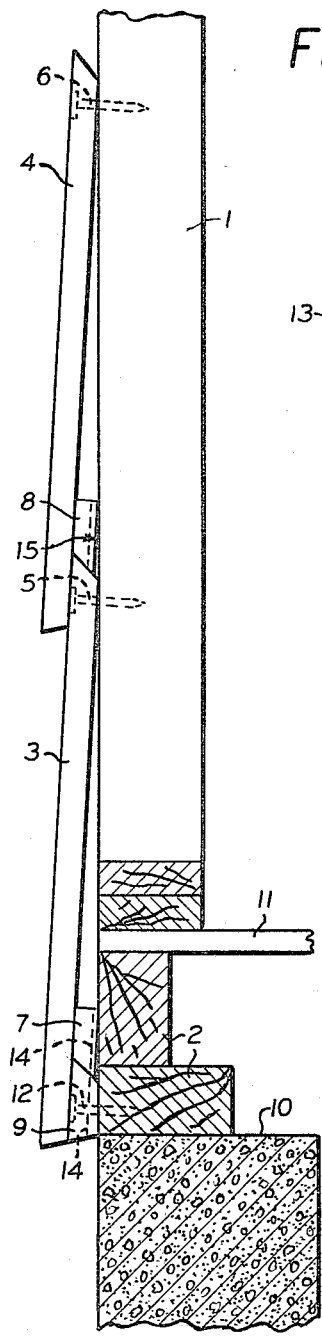
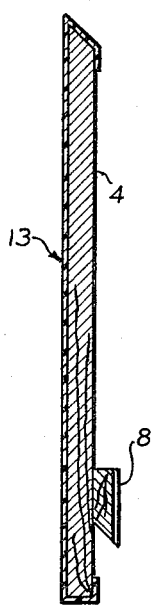
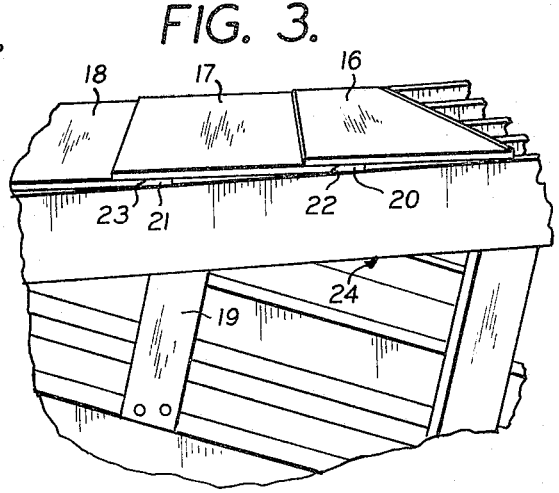
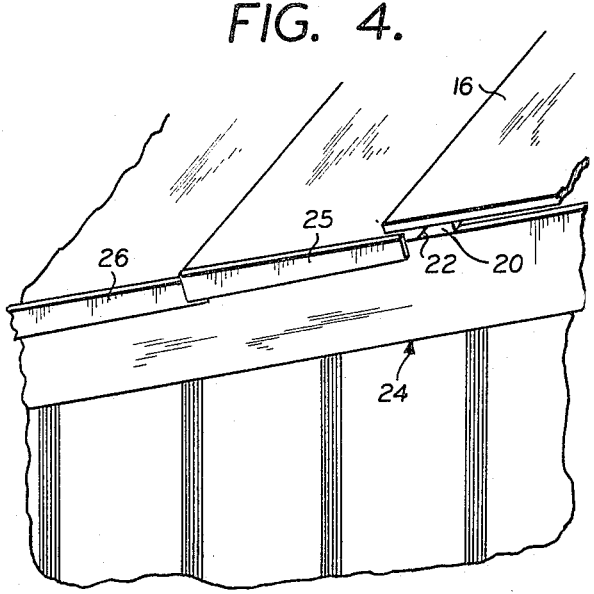
INVENTORS
RICHARD I. ELLIOTT
FREDERICK R. ASHBY
BY
*James M. Heilman*
ATTORNEY.

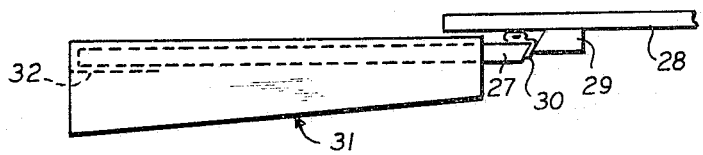
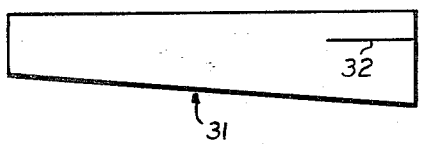
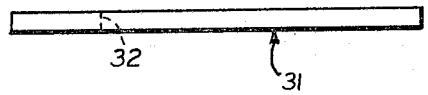
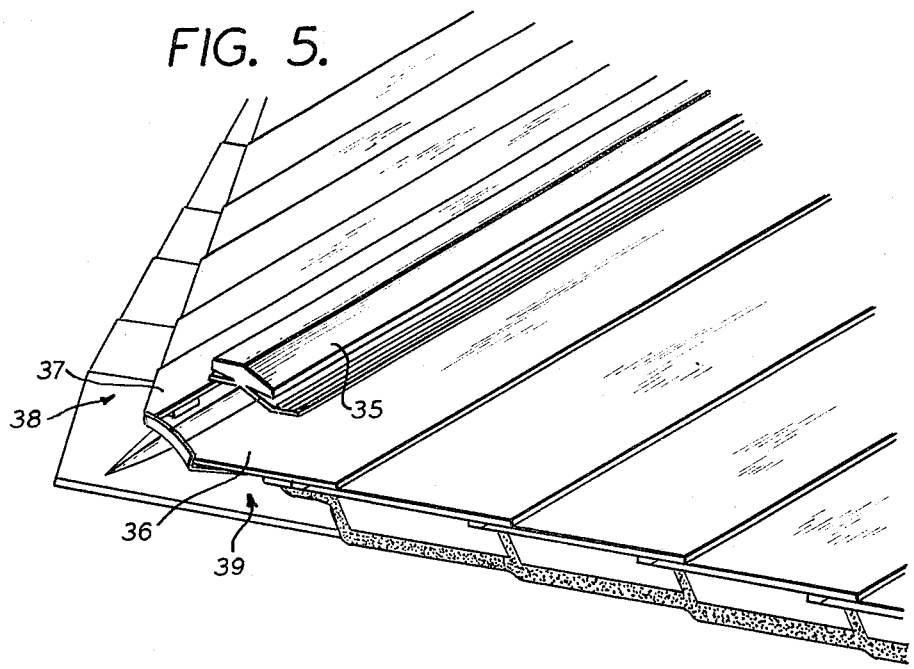
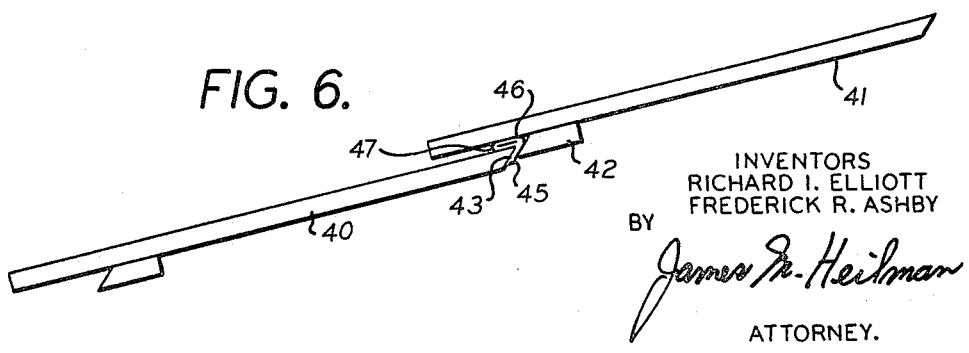

United States Patent Office 3,284,967
Patented Nov. 15, 1966

3,284,967
LAMINATED COVER ELEMENTS AND FLASHING AND SEALING MEANS THEREFOR
Richard I. Elliott and Frederick R. Ashby, Carmel, N.Y., assignors to United States Plywood Corporation, New York, N.Y., a corporation of New York
Filed Mar. 18, 1964, Ser. No. 352,863
16 Claims. (Cl. 52—58)

The present invention is concerned broadly with a long lived or permanent type of structural elements utilized in building and other structures, particularly as roofing and external wall sections. The invention is not only concerned with these structural elements per se, but is especially concerned with a roof or wall section wherein a plurality of the elements of the present invention are used in combination to produce a substantially permanent wall or roof which will require no maintenance or upkeep such as repairs, caulking, painting and the like over a period of many years.

A particular adaptation of the present invention is the use of a ligno-cellulose material, such as lumber, plywood, hardboard, particle board and similar type elements which are laminated with an impervious plastic film and are so fabricated in a wall or roof structure in combination with metal elements which also have been laminated with a film to produce a permanent, almost indestructible building structure. Another specific adaptation of the present invention is the use of a unique seal element, which secures a very effective seal between a plurality of elements to secure a very desirable weatherproof roof or other structure.

Thus the present invention is concerned with an improved self-aligning lap lignocellulose structure. The invention is more generally concerned with a lap structure which may comprise clapboard sidings, shingles or equivalent structural elements. The elements or structures may be of wood or of any composition or molded material and the like which is used as a covering, particularly as an outer covering for houses and other buildings. One object of the present invention is to provide a siding element or shingle which is wind and weather proof and which will prevent insects and the like from entering the building. In general, the siding of the present invention is preferably a wood or woody base (bagasse, corn stalks), generally a ligno-cellulose base such as lumber, plywood, hardboard, particle board, chipboard, waterproof insulating boards and impregnated paper pulp boards, and the like. A very desirable lap structure of the present invention is a plywood or lumber element which has a plastic impervious film adhered at least on its exposed outer surface. These are used in conjunction with metal elements laminated with plastic film.

The clapboard or lap structure of the present invention will have no exposed nail holes and will require no putty or other fillers. The siding is firmly held at both the top and the bottom to give the desired lap between courses. The present structure will provide a covering of long life, of pleasing and attractive appearance, and will require a very low cost of upkeep. As pointed out heretofore, the siding of the present invention is preferably of lignocellulose base as, for example, plywood, which will provide sealing means associated therewith and which will effectively seal the joints between the overlapping shingles and/or clapboard to provide a cushion in order to prevent breakage and the like.

It is well-known in the art that when rigid types of covering elements are applied, particularly to a building structure, they must overlap, whereby a portion of each rigid element is covered by another element to provide a weatherproof construction. The rigid elements with which this invention is concerned are commonly secured to structures by means of nails or various types of clips.

One preferred siding element of the present invention is a lignocellulose base wood structure as, for example, plywood which has been coated with a plastic or equivalent film or a covering of a mixture of resin and fibers. With certain types of decorative plywood, it is preferred that the plastic film be transparent and that the board as, for example, the plywood panel have the film extend over the edges, and also extend around to at least a portion of the back surface of the plywood. One satisfactory film comprises a polyvinylfluoride film manufactured by the duPont Company and sold under the tradename "Tedlar." It is also within the concept of the present invention to use other types of plastic skins, or phenolic-resin fiber compositions such as "Crezon" manufactured by Crown Zellerbach. Resin impregnated paper is also a satisfactory covering. A satisfactory plastic or semi-plastic covered board is "Duraply" manufactured by U.S. Plywood.

The present invention may be readily understood by reference to the drawings illustrating embodiments of the same. FIGURE 1 is a side view of two siding elements attached to a structure. FIGURE 2 illustrates in some detail the structure of one siding element of the present invention. FIGURE 3 illustrates the positioning of roof elements of the present invention on conventional roof framing of rafters and trusses. FIGURE 4 illustrates the method and technique of the present invention of sealing the edges. FIGURES 4A, 4B and 4C show details of the side flashing elements. FIGURE 5 shows the method of securing a weatherproof interlocking of the elements along the top and in the valley of a typical roof, while FIGURE 6 shows in detail the unique seal element utilized in combination with the alignment strip.

Referring specifically to FIGURE 1, studding 1 or equivalent structural backing elements are shown vertically positioned on base structure 2 which, in turn, is positioned on foundation 10. Flooring 11 is also illustrated.

Two pieces of siding 3 and 4 are shown affixed to the studding by means of nails or equivalent elements 5 and 6. Affixed to the rear of the siding elements 3 and 4 are alignment strips 7 and 8 respectively.

Alignment strip 8 contains a 45° recess in the lower edge thereof into which seats the upper edge of panel 3. Thus, by carefully aligning the first course comprising a plurality of elements 3 to the structure, the succeeding courses can be readily and very accurately and quickly nailed to the structure.

As illustrated, a starter strip 9 affixed by means of nails 12 is used at the lower end of the first course which seats into the lower edge of strip 7 which is also beveled 45° at its lower edge.

FIGURE 2 illustrates in some detail one type of element of the present invention. For example, when a panel or shingle is about 12" x 12" x 3/8" plywood having three plies, it is preferred that the backing strip be about 3/8" in thickness and about 1½" long and have a 45° cut at the lower edge thereof. The angle, of course, can vary from about 30 to 60°. The angle of the upper edge of the ply should also be equivalent to the angle of the lower edge of the backing strip in order to secure a perfect seat and resultant tight weatherproof fit.

It is to be understood that the structural unit may be a clapboard and be of a length of 6' to 20' and longer.

A plastic or semi-plastic film, i.e., a waterproof film 13 is shown extending along the outer surface of panel 4 around the lower edge thereof and upwardly for a distance along the back edge thereof. A preferred adaptation is to have the covering extend over the top beveled edge and along the side edges of the panel and along the back surface for a predetermined distance of from about ¼" to 1" or more. By having the plastic film or covering extend over the top edge of the panel, which edge seats in the recess of the alignment strip of the next course, a very desirable tight weatherproof joint is secured.

It is also within the concept of the present invention to use alignment strips which may comprise corrosion resistant metals. Under certain circumstances, it may be desirable to provide weep holes 14 and 15, particularly in the lower starter strip 9. However, if sheathing is used on top of the stud, it is within the concept of the present invention to provide weep holes as required.

Referring specifically to FIGURE 3, the use of a plurality of the board elements of the present invention as a roof structure is shown. Units 16, 17 and 18 are supported by rafter 24 and truss 19 and are interlocked and sealed as described by means of alignment strip 20 on the underside of unit 16 and alignment strip 21 on the underside of unit 17. Two seals which will hereinafter be more specifically described 22 and 23 are positioned between the alignment strip 20 and the upper tapered edge of unit 17 and between alignment strip 21 and the upper tapered edge of unit 18. These seals which may be rubber or other type of plastic, or soft material, give the overall structure a tightness and flexibility which is extremely desirable.

FIGURE 4 is an extension of FIGURE 3 and similar elements are similarly numbered. FIGURE 4 shows the method of weatherproofing the ends of the units or roof boards along rafter 24. Metallic side flashing elements 25 and 26, preferably aluminum elements, especially aluminum elements laminated with a similar film as that described are utilized. These elements are of channel construction where the angle between the respective planes is about 90°. Their length is preferably about the width of the laminated plywood roofing boards. It is to be noted that the upper end of element 25 seats snugly under the lower edge of laminated board 16. The upper end of element 26 seats snugly under the lower side of laminated board 17. Also the lower end of 25 seats over the upper end of element 26. The widths of the respective sides of elements 25 and 26 may vary appreciably but are in the range from about ¾" to 2" to 4", as for example about 1". It is preferred that the side which lays over the rafter be tapered, and that the width at the upper end be less than the width at its lower end. It is preferred that the width of the top side be uniform and be from about ¾" to 1½" as for example about 1". It is preferred that the upper end of the element which laps over the rafter be ¾" to 1½" wide as for example 1" wide at the upper end and be of greater width at its lower end, as for example from about 1" to 3" as for example about 1⅝".

The details of the side flashing elements are shown in FIGURES 4A, 4B and 4C. FIGURE 4A is a side view showing the upper end of panel 27 interlocked with the alignment strip 29 which is on the back side of panel 28. Seal 30 is between the panels as hereinbefore described. FIGURE 4B is a back side view of the side flashing element and shows the hook like appendage 32 which seats under the lower edge of the panel. FIGURES 4A and 4B show how the forward end of the side which laps over the roof panel is wider than the rearward end.

FIGURE 4C is a top view of the flashing element and shows that the top side is of a uniform width. The depth of the hook 32 is slightly greater than the thickness of the panel; and its length is preferably in the range of about ½" to 3", as for example about 1".

Referring specifically to FIGURE 5 the top metallic element 35, which is preferably a plastic film laminated decorative aluminum element is readily affixed to top laminated panels 36 and 37. The valleys 38 and 39 are also preferably aluminum and the ends of the panels 36 and 37 etc. are rendered weatherproof as described with respect to FIGURE 4. Plain ridge seal (Tedlar and metal) may be substituted for vented ridge cover.

Referring to FIGURE 6 panels 40 and 41 are shown interlocked by means of alignment strip 42 and the upper tapered edge of panel 40. In accordance with a desired type of structure there is affixed to the tapered side of panel 40 a V shaped resilient element 43 which secures a desirable effective seal. It is preferred that the seal be of dimensions so that the lower edge 45 cover the complete taper of panel 40. It is also preferred that it be in one piece and that its length extend the entire length of the laminated plywood board. The width of the upper side 46 may be from ¼" to 3" as for example about ½". This resilient or flexible seal member has a bead structure 47 at the back edge of the upper side of a diameter in the range from about ⅛" to ½" as for example about 3/16".

This seal or gasket 43 is stapled to the lower panel on the beveled edge, preferably at the factory. The gasket may be of plastic such as neoprene etc., but is preferably of extruded formed rubber. The bead may be solid or hollow and may be of any geometrical configuration. This unique gasket makes the roof of superior construction and is very effective in weatherproofing the roof and for extending the life of the roof.

The present invention may be more fully understood by the following examples illustrating the same.

*Example 1*

Panels of the present invention were prepared as follows: white Tedlar film (0.002") was rotary laminated to ⅜" exterior A.C. Douglas fir plywood and then fabricated to self-aligning exterior siding design. The backing strip was attached with phenol resorcinol glue and galvanized staples 9" O.C. Exposed long edge of the siding panel was encapsulated with white Tedlar film (0.002" thick).

These panels were placed in a sweat box where the interior atmosphere was 100% relative humidity and 131° F. with ambient room conditions on the siding exterior. There was no change after 48 days exposure.

The panels were treated with boiling water. No change after 1000 hours.

The panels were placed in a fog cabinet and exposed in an enclosure at 100% relative humidity and 120° F. for 120 days. There was no change noted.

Panels were subjected to cyclic soak-freeze-thaw wherein they were placed in tap water at ambient room conditions to equilibrium; frozen at −20° F. for 16 hours and then dried at 150° F. to equilibrium. There was no change after 10 complete cycles.

Panels were subjected to a Gordon Kline test wherein they were exposed to 10 cycles of 2 hour boil and 22 hour dry at 150° F. There was no change noted. The panels were subjected to a water soak test. There was no change after 6 months. Panels were exposed to a cyclic-heat-humidity test wherein they were exposed to eight cycles of 150° F. (equilibrium) and 100% relative humidity (equilibrium). No change noted.

Panels were exposed to a peel test. Film will not peel from wood substrate before and after all accelerated tests.

*Example 2*

A water test was made on a roof system of the present invention as follows: two roof models were constructed to include details of valley, ridge, soffit and rake as well as butt joints on roof surface. Water was sprayed on the roof to simulate normal direction of rain fall on roof. With 20 p.s.i. hose pressure nozzle was placed 12" from the joint and in same plane and slowly moved along each joint as well as up and down valley. With 20 p.s.i. hose pressure, nozzle was placed against joint and valley cover and procedure 2 was repeated.

Investigation of the underside of roofs showed no indication of water penetration or wetting at completion of test.

Thus, the structure of the present invention permits the use of plywood sidings and roofs whereby the same are permanently affixed to the structure. The structure permits the use of plywood siding without resulting denting, splitting and damage. The structure of the present invention produces walls and roofs of great strength and rigidity that insulate the structure against the transfer of either heat or cold.

As pointed out heretofore, the structures of the present invention are preferably plywood sidings having adhered thereto waterproof and weather-resistant films. These films may be either transparent in order to have the decorative wood appear therethrough or may be of the type which will permanently take paints, enamels, and the like. Other films may be used as, for example, metal foils such as aluminum and copper foils in a mix as described with respect to the transparent films.

The method of adhering the film to the board or plywood may be varied appreciably. However, one satisfactory method is to prime the face of the panel with a satisfactory adhesive, to flash off the excess solvent and then to apply the film from a roll or to flow on a resin-fiber mix. In one method of operation the edge of the film is coated with adhesive over the area that the film is applied along the edges and to the rear of the plywood. A very desirable method of applying the film or encapsulating the panel is described in copending application Serial No. 228,478, filed October 4, 1962, entitled "Panel Edge Covering."

Thus, as pointed out heretofore, the panels such as shingles and clapboards may be of any desirable size from a 4′ x 8′ type of siding to a 12′ x 12″ type shingle. The plies may vary from 3 to 5 and more having a thickness of from 1/8 to 3/4″ and greater. The alignment strips will also vary depending upon the size of the sheet or panel.

Thus as pointed out heretofore, the invention is specifically concerned with the use of a plurality of these laminated structural elements as, for example, laminated plywood in conjunction with unique laminated metal seal elements such as laminated aluminum, copper or the like.

What is claimed is:

1. A weatherproof, lightweight roof structure which comprises in combination, (1) a plurality of lignocellulose panels, (2) thin impervious plastic films laminated to the face surfaces of said panels, said panels characterized by having the top edges beveled downwards toward the back surfaces, (3) alignment strips affixed to the back surfaces of said panels near the bottom edges thereof and substantially parallel to said bottom edges, said alignment strips characterized by the bottom edges thereof beveled upwardly toward the back edges of said panels and wherein said structure is characterized by the upper beveled side of a first panel seating securely between the back surface of a second panel and the lower side of the alignment strip attached to said second panel, whereby the lower area of said second panel will overlap the upper area of said first panel, and (4) a resilient gasket positioned between the beveled top side of said first panel and the lower beveled side of said alignment strip, said resilient gasket characterized by being rigidly attached to said first panel and having a configuration substantially equivalent to the configuration of said beveled top side.

2. Structure as defined by claim 1 wherein said panels are plywood panels and wherein said films are laminated to the lower sides of said panels and to portions of the back surfaces adjacent said lower sides.

3. Structure as defined by claim 2 wherein said films are laminated to the lateral sides of said panels and to portions of the back surfaces adjacent said vertical sides.

4. Structure as defined by claim 1 wherein said gasket is further characterized by the back edge thereof, between the panels, being of a greater thickness than the remainder of said gasket.

5. Structure as defined by claim 4 wherein the back edges of said gaskets are of a beaded configuration.

6. Structure as defined by claim 1 wherein said flexible gasket is selected from the class consisting of rubber, neoprene, and soft plastic.

7. Structure as defined by claim 5 wherein metallic side seals overlap end areas of the top surfaces of said panels and extend downwardly and below the lateral sides of said panels to adjacent roof end fascia.

8. Structure as defined by claim 1 wherein metallic side seals overlap end areas of top surface of said panels and extend downwards to top surface of roof valley.

9. Structure as defined by claim 7 wherein the faces of said metallic side seals are laminated with thin impervious plastic films.

10. Structure as defined by claim 7 wherein portions of said seals which overlap said end areas extend into the areas wherein said panels overlap.

11. Structure as defined by claim 8 wherein portions of said seals which overlap extend downwardly along the lower sides of said panels and partially along end areas of the back surfaces of said panels.

12. A weatherproof lightweight roof structure which comprises in combination; (1) a plurality of ligno-cellulose panels, said panels characterized by having the top edges beveled downwardly toward the back surface of said panels; (2) thin impervious plastic films laminated to the face surface of said panels; (3) alignment strips affixed to the back surfaces of said panels near the bottom edges thereof and substantially parallel to said bottom edges, said alignment strips characterized by the bottom edges thereof beveled upwardly toward the back surfaces of said panel, and wherein said structure is characterized by the upper beveled edge of a first panel seating securely behind the back surface of a second panel and the lower side of the alignment strip attached to said second panel, whereby the lower area of said second panel will overlap the upper area of said first panel; (4) a flexible gasket positioned between said beveled edge of said first panel and the alignment strip of said second panel; (5) a first L configuration flashing element having one side thereof positioned along the top surface of said first panel and under extending said second panel, the other side of said first flashing element extending along the end of said first panel; and (6) a second L configuration flashing element having one side thereof positioned along the top surface of said second panel and the other side thereof positioned along the end of said first flashing element associated with said first panel.

13. Structure as defined by claim 12 wherein said panels are supported on: (7) rafters and said other sides of said flashing elements extend downwardly along said rafters.

14. Structure as defined by claim 12 wherein the widths of said other sides of said flashing elements increase in the direction from said second panel to said first panel.

15. Structure as defined by claim 12 wherein the thickness of said flexible gasket is greater between said panels than between said first panel and said alignment strip associated with said second panel.

16. Structure as defined by claim 12 wherein said flashing elements are laminated with impervious plastic films.

References Cited by the Examiner

UNITED STATES PATENTS

| | | | |
|---|---|---|---|
| 1,822,410 | 9/1931 | Macan | 52—556 X |
| 2,135,811 | 11/1938 | Goslin | 52—552 X |
| 2,248,723 | 7/1941 | Robinson | 52—409 X |
| 2,276,170 | 3/1942 | Elmendorf | 52—409 X |
| 2,358,396 | 9/1944 | Hogan | 52—94 X |
| 2,450,562 | 10/1948 | Robinson et al. | 52—556 |
| 2,853,531 | 9/1958 | Cleaver | 117—132 |
| 3,131,442 | 5/1964 | Persson-Melin | 52—539 X |
| 3,157,965 | 11/1964 | Watson | 52—394 |
| 3,228,164 | 1/1966 | Ettore | 52—309 |

FOREIGN PATENTS

| | | |
|---|---|---|
| 507,299 | 11/1954 | Canada. |
| 600,933 | 11/1925 | France. |
| 821,570 | 10/1959 | Great Britain. |

OTHER REFERENCES

Modern Plastics, October, 1959 (pp. 89–91 and 200).

FRANK L. ABBOTT, *Primary Examiner.*

M. O. WARNECKE, *Assistant Examiner.*